United States Patent
DeKimpe et al.

(10) Patent No.: US 6,665,682 B1
(45) Date of Patent: Dec. 16, 2003

(54) PERFORMANCE OF TABLE INSERTION BY USING MULTIPLE TABLES OR MULTIPLE THREADS

(75) Inventors: Daniel Martin DeKimpe, La Selva Beach, CA (US); William Earl Malloy, Santa Clara, CA (US); Simon Edward Moore, Burbage (GB); Gary Robinson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,647

(22) Filed: Jul. 19, 1999

(51) Int. Cl.[7] .............................................. G06F 17/30
(52) U.S. Cl. ....................................... 707/101; 707/102
(58) Field of Search ................................. 707/100, 101, 707/3, 2, 102, 1, 4

(56) References Cited

U.S. PATENT DOCUMENTS

| | | | |
|---|---|---|---|
| 5,471,592 A | * 11/1995 | Gove et al. ............ 395/300.03 |
| 5,627,979 A | * 5/1997 | Chang et al. ................ 395/335 |
| 5,799,151 A | * 8/1998 | Hoffer .................... 395/200.34 |
| 5,905,985 A | * 5/1999 | Malloy et al. ............... 707/100 |
| 6,020,889 A | * 2/2000 | Tarbox et al. ............... 345/356 |
| 6,061,515 A | * 5/2000 | Chang et al. ................ 395/702 |
| 6,154,766 A | * 11/2000 | Yost et al. ................... 709/201 |
| 6,175,833 B1 | * 1/2001 | West et al. ................. 707/102 |
| 6,205,447 B1 | * 3/2001 | Malloy ....................... 707/102 |

* cited by examiner

Primary Examiner—Kim Vu
Assistant Examiner—Tam V Nguyen
(74) Attorney, Agent, or Firm—Fay, Sharpe, Fagan, Minnich & McKee, LLP (57) ABSTRACT

A method, apparatus, and article of manufacture for improved performance of table insertion by using multiple tables or multiple threads. A command is executed in a computer to perform a database operation on a relational database stored on a data store connected to the computer. A multi-dimensional database is represented as a relational schema in the relational database, wherein the relational schema includes one or more base tables, related dimension tables, and a key table. Each of the base tables and the key table is accessed concurrently to perform the database operation.

45 Claims, 8 Drawing Sheets

PERFORMANCE OF TABLE INSERTION BY USING MULTIPLE TABLES OR MULTIPLE THREADS

BACKGROUND OF THE INVENTION

1. Field of the Invention

This invention relates in general to database management systems performed by computers, and in particular, to the use of a relational database management system that supports on-line analytical processing.

2. Description of Related Art

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases comprised of traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality is also known as on-line analytical processing (OLAP).

OLAP generally comprises numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:

- calculations and modeling applied across dimensions, through hierarchies and/or across members;
- trend analysis over sequential time periods; slicing subsets for on-screen viewing;
- drill-down to deeper levels of consolidation;
- reach-through to underlying detail data; and
- rotation to new dimensional comparisons in the viewing area.

OLAP is often implemented in a multi-user client/server mode and attempts to offer consistently rapid response to database access, regardless of database size and complexity. While some vendors have proposed and offered OLAP systems that use RDBMS products as storage managers, to date these offerings have been unsuccessful for a variety of reasons.

In particular, performance of some OLAP systems that use a RDBMS is largely limited by the ability of the underlying RDBMS to insert large numbers of rows. Generally, relational databases are designed to optimize aggregate throughput of inserted data among many connections. In some systems, the RDBMS uses very large transactions on a single connection to insert data into tables of a star schema. The use of a single transaction limits the ability of the RDBMS to exploit all available system resources. As a result, there is a need in the art for an enhanced technique for using RDBMS products as storage managers for OLAP systems.

SUMMARY OF THE INVENTION

To overcome the limitations in the prior art described above, and to overcome other limitations that will become apparent upon reading and understanding the present specification, the present invention discloses a method, apparatus, and article of manufacture for improved performance of table insertion by using multiple tables or multiple threads.

According to an embodiment of the invention, a command is executed in a computer to perform a database operation on a relational database stored on a data store connected to the computer. A multi-dimensional database is represented as a relational schema in the relational database, wherein the relational schema includes one or more base tables, related dimension tables, and a key table. Each of the base tables and the key table is accessed concurrently to perform the database operation.

BRIEF DESCRIPTION OF THE DRAWINGS

Referring now to the drawings in which like reference numbers represent corresponding parts throughout.

DETAILED DESCRIPTION OF A PREFERRED EMBODIMENT

In the following description of a preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises an OLAP system that is designed for a wide-range of multi-dimensional reporting and analysis applications. The OLAP system is based both on Arbor Software's Essbase OLAP software and IBM's DB2 RDBMS software. The present invention utilizes a number of components from Arbor Software's Essbase OLAP system, including components that provide data access, navigation, application design and management and data calculation. However, the present invention comprises new elements that perform database operations, such as storing and retrieving data, for the OLAP system in a relational database. The present invention replaces the integrated multi-dimensional data storage manager of Arbor Software's Essbase OLAP software with a relational storage manager based on IBM's DB2 RDBMS software. The relational storage manager enables the OLAP system to store data directly into a relational database.

The relational database utilized by the present invention provides the capacity of industry leading relational databases, and can be managed by familiar RDBMS systems management, backup, and recovery tools. It also offers the advantage of providing access to data using standard SQL (Structured Query Language). In addition, the present invention is designed for applications with very large data volumes. Further, the present invention leverages the existing RDBMS skills of information technology professionals.

The present invention differs from prior art ROLAP (Relational-OLAP) products in significant ways. Prior art ROLAP products, for example, are unsuited for applications which require complex calculations, read/write support, or high numbers of concurrent users. In addition, prior art ROLAP products require extensive support staffs or consultants to develop and deploy applications.

The present invention does not share any of these limitations. Because it integrates Arbor Software's Essbase OLAP software with IBM's DB2 RDBMS software, the present invention provides simplified application design, robust calculation capabilities, and flexible data access coupled with scalability of user access. Significant advantages of the present invention over ROLAP include: performance; automatic table, index and summary management; robust analytical calculations; multi-user read and write access; and security.

With regard to performance, the present invention is designed to deliver consistent, fast response measured in seconds regardless of database size. Prior art ROLAP products measure response time in tens of seconds, minutes or hours.

With regard to automatic table, index and summary management, the present invention automatically creates and manages tables and indices within a star schema in the relational database. The present invention can also populate the star schema with calculated data. Prior art ROLAP products require teams of database architects to manage hundreds or thousands of summary tables manually in order to deliver acceptable end-user performance.

With regard to robust analytical calculations, the present invention is designed to perform high-speed data aggregations (revenue by week, month, quarter and year), matrix calculations (percentages of totals), cross-dimensional calculations (market share and product share) and procedural calculations (allocations, forecasting). Prior art ROLAP products provide less robust calculation capabilities.

With regard to multi-user read and write access, the present invention is designed to support multi-user read and write access which enables operational OLAP applications such as budgeting, planning, forecasting, modeling, "what-ifing" etc. On the other hand, prior art ROLAP products are read-only.

With regard to security, the present invention is designed to deliver robust data security down to the individual data cell level. Prior art ROLAP products provide no security, or only limited application level security.

The capabilities of the present invention are the same as those of Arbor Software's Essbase OLAP software, including sophisticated OLAP calculations, comprehensive OLAP navigation features, complex database access support and multi-user read/write functionality. In addition, front-end tools, system management tools and applications from Arbor Software and leading third parties will also work with the present invention. Consulting and education companies that have developed expertise with Arbor Software's Essbase OLAP software can immediately apply their experience and knowledge to the present invention.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Hardware Environment

Figure 1:
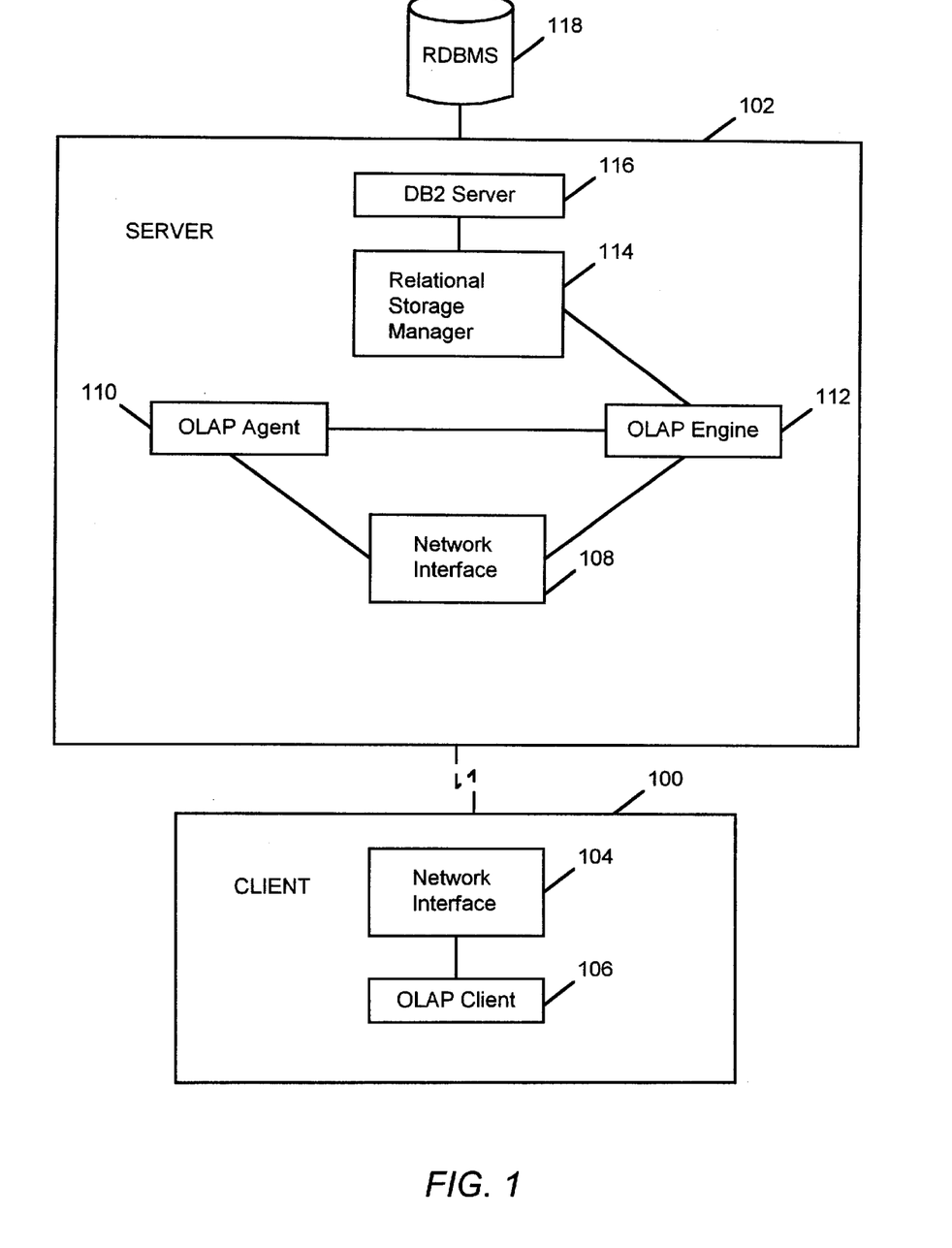
FIG. 1 is a block diagram illustrating a hardware environment used to implement a preferred embodiment of the present invention.

FIG. 1 is a block diagram illustrating a hardware environment used to implement the preferred embodiment of the present invention. In the hardware environment, a client/server architecture is illustrated comprising an OLAP client computer 100 coupled to an OLAP server computer 102. In the hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AIX, UNIX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100, and a network interface program 108, an OLAP agent program 110, an OLAP engine program 112, a relational storage manager (RSM) program 114, and a DB2 server program 116 executed by the OLAP server 102. The DB2 server program 116, in turn, performs various database operations, including search and retrieval operations, termed queries, insert operations, update operations, and delete operations, against one or more relational databases 118 stored on a remote or local data storage device.

The present invention utilizes a number of components from Arbor Software's Essbase OLAP system, including the network interface 104, OLAP client 106, network interface 108, OLAP agent 110, and OLAP engine 112. These components provide data access, navigation, application design and management and data calculation. However, the relational storage manager 114 and DB2 server 116 comprise new elements that access (e.g., store and retrieve) data for the OLAP system in a relational database.

Those skilled in the art will recognize that the hardware environment illustrated in FIG. 1 is not intended to limit the present invention. Indeed, those skilled in the art will recognize that other alternative hardware environments may be used without departing from the scope of the present invention.

Conceptual Structure of the Multi-Dimensional Database

Figure 2:
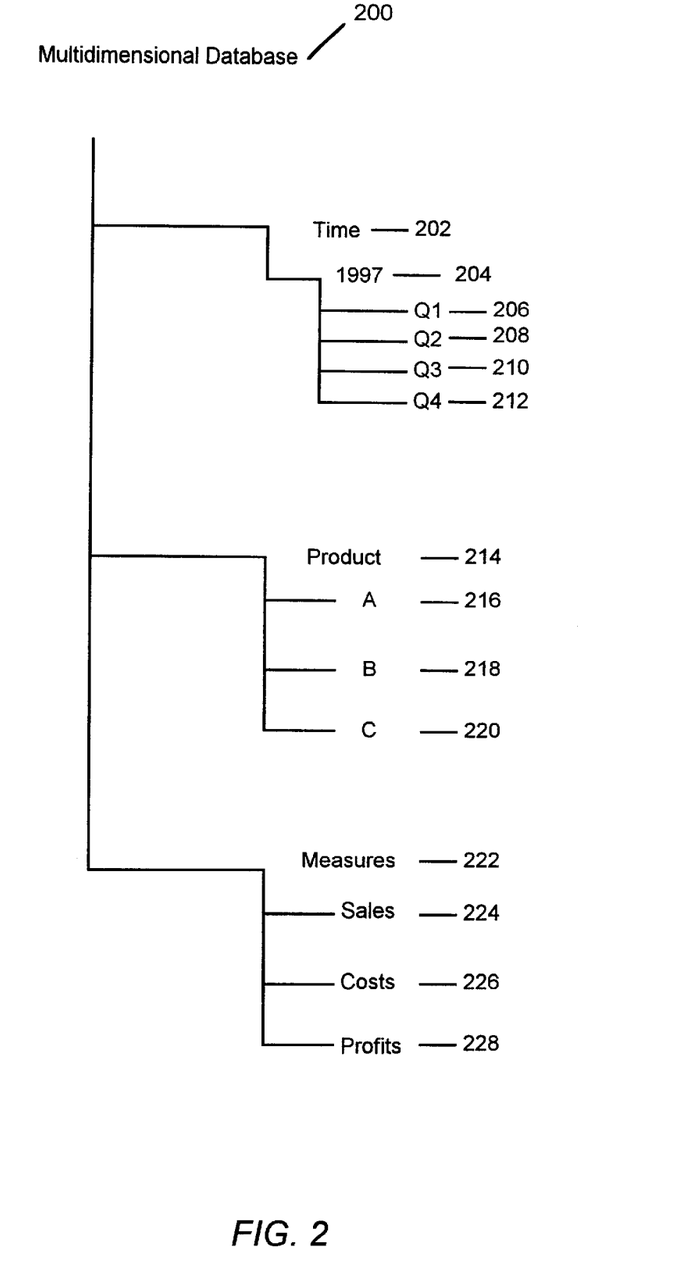
FIG. 2 is a diagram that illustrates the conceptual structure (i.e., an outline) of a multi-dimensional database according to the present invention.

FIG. 2 is a diagram that illustrates the conceptual structure (i.e., an outline) of a multi-dimensional database 200 according to the present invention. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-Dimensional Database

Figure 3:
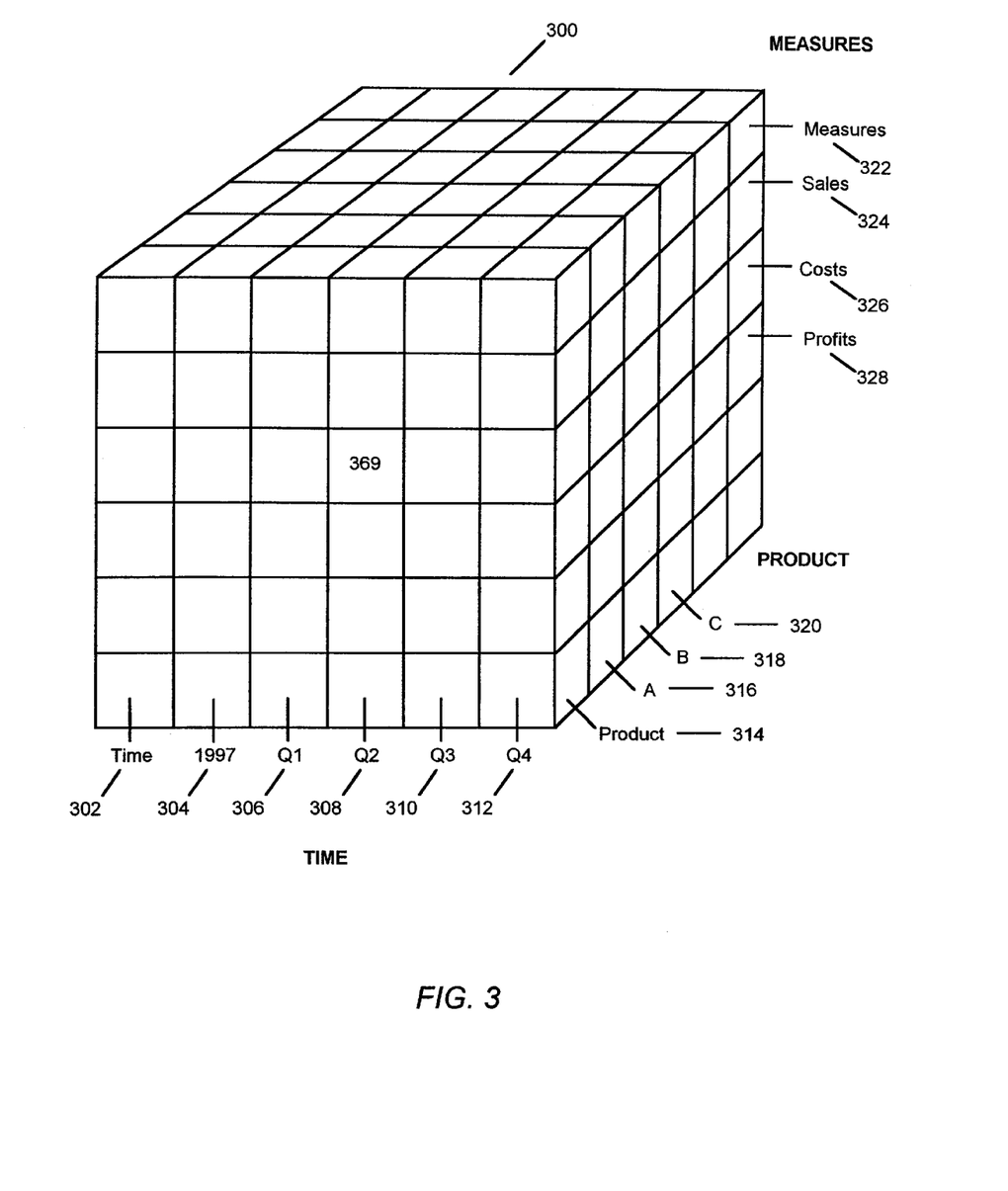
FIG. 3 is a diagram that illustrates the logical structure of a multi-dimensional database according to the present invention.

FIG. 3 is a diagram that illustrates the logical structure of a multi-dimensional database 300 according to the present invention. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension acts as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the example cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, QI 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 366, Q2 308, Q3 310, and Q4 312.

The true analytical power of an OLAP system, however, is evidenced in its ability to evaluate formulae where there are members from more than one dimension. An example is a multi-dimensional allocation rule used in market profitability applications. If for example, the Costs 326 for Product A 316, Product B 318, and Product C 320 are not accounted for separately, but only the Costs 326 for every Product 314 are available, then the Costs 326 for Product A 316, Product B 318, and Product C 320 could be modeled by assuming that they are proportional to sales revenue. The Costs 326 for Product A 316, Product B 318, and Product C 320 could be determined by using the following formulae:

Costs 326 for Product A 316=(Sales 324 for Product A 316)/(Sales 324 for Product 314)

Costs 326 for Product B 318=(Sales 324 for Product B 318)/ (Sales 324 for Product 314)

Costs 326 for Product C 320=(Sales 324 for Product C 320)/ (Sales 324 for Product 314)

The references to several dimensions within the same rule make it a Cross-Dimensional Formula.

Physical Structure of the Multi-Dimensional Database

The physical structure used to store the multi-dimensional data by Arbor Software's Essbase OLAP software is described in U.S. Pat. No. 5,359,724, issued Oct. 25, 1994, to Robert J. Earle, assigned to Arbor Software Corporation, and entitled "METHOD AND APPARATUS FOR STORING AND RETRIEVING MULTI-DIMENSIONAL DATA IN COMPUTER MEMORY", which patent is incorporated by reference herein.

The '724 patent discloses a method for storing and retrieving multi-dimensional data in which a two-level data structure is defined, wherein one level contains those dimensions (i.e., a sub-cube) chosen by the user to result in dense data blocks and the other level contains the remaining dimension combinations that are used as sparse indices (i.e., sparse index keys or dimension identifiers) to select the dense data blocks by identifying dimensions. In particular, a sub-cube of a multi-dimensional database is dense if a relatively high percentage of the possible combinations (i.e., intersections) of dimension members contain data values. The remaining dimensions of the multi-dimensional database are sparse as a relatively high percentage of the possible combinations of their dimension members do not contain data values. These sparse dimensions are used to index the dense data blocks. The total possible number of intersections can be computed by multiplying the number of members in each dimension. The users select the specific dimensions which form the dense data blocks and sparse indices based on their knowledge of the characteristics of the multi-dimensional data.

A sparse index file contains information used to select the dense data blocks. The sparse index file provides an ordering of the blocks and holds data about the age and usage of each block.

Relational Database Structure

Figure 4:
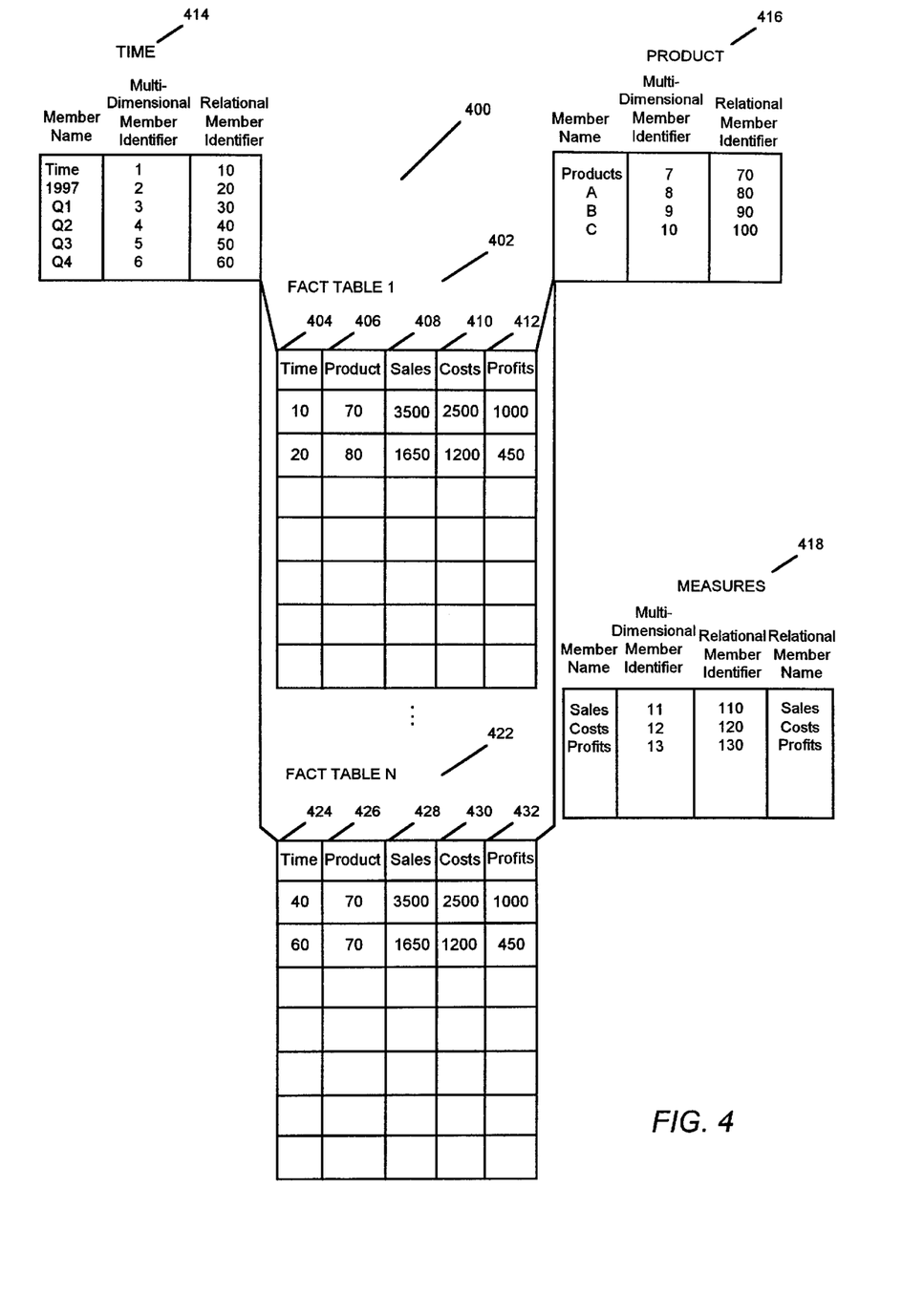
FIG. 4 is a diagram that illustrates a structure for storing multi-dimensional data in a relational database structure according to the present invention.

FIG. 4 is a diagram that illustrates a structure for storing multi-dimensional data in a relational database structure according to the present invention. The present invention stores data in a star schema 400 in the relational database 118, as opposed to a specialized multi-dimensional data store as described in the '724 patent. However, in order to work correctly with Arbor Software's Essbase OLAP software, the relational storage manager 114 and DB2 server 116 of the present invention work together to emulate the structure and functions performed in the '724 patent, even though a different database is used to store the multi-dimensional data.

In the present invention, the multi-dimensional data is stored in a star schema 400 in the relational database 118. A star schema 400 is a set of relational tables including multiple main tables 402 through 422 and related dimension tables 414, 416, and 418, wherein the dimension tables 414 and 416 intersect the main tables 402 through 422 via common columns, and wherein the dimension table 418 has a column in the main tables 402 through 422 corresponding to each of its rows. The preferred embodiment of the present invention provides a view of multiple partitions as a single table. In particular, the term "partition" as used herein does not necessarily refer to partitions as defined by a standard relational database system, but, instead, refers to the partitioning of data across individual main tables as used by the preferred embodiment of the present invention. A star schema 400 has several benefits over storing information in traditional RDBMS tables used for on-line transaction processing (OLTP).

Because a star schema 400 is simple, having few tables, it minimizes the complexity required to process database operations. This helps both to speed performance and to ensure correct results of database operations.

Moreover, the use of a star schema 400 is a well known, standard model, and many relational databases 118 have built in optimization for it. By adhering to this standard model, the present invention automatically takes advantage of any such optimization.

In the example of FIG. 4, the boxes and ellipses represent the base tables 402 through 422 and dimension tables 414, 416, and 418. The connections between the boxes 402 through 422 and 414 and 416 represent star joins between tables. The base tables 402 through 422 are also known as fact tables. The star schema 400 thus comprises fact tables 402 through 422, which are joined to one or more dimension tables, TIME 414 and PRODUCT 416, according to specified relational or conditional operations. The fact tables 402 through 422 hold data values, while the dimension tables TIME 414, PRODUCT 416, and MEASURES 418 hold member information. As a result, the dimension tables 414, 416, and 418 are relatively small, and the fact tables 402 through 422 are usually very large.

The dimension tables TIME 414 and PRODUCT 416 are usually joined to the fact tables 402 through 422 with an equivalence condition. In this example of a star schema 400, there are no join conditions between the dimension tables TIME 414, PRODUCT 416, and MEASURES 418 themselves.

In the preferred embodiment, one dimension, called an "Anchor" dimension, is treated differently from the other dimensions, called "non-anchor" dimensions, in that all of its members are mapped to columns in the fact tables 402 through 422. For example, in FIG. 4, the MEASURES dimension 418 is the anchor dimension. There is one column in each fact table 402 through 422 (i.e., SALES 408 and 428, COSTS 410 and 430, and PROFITS 412 and 432) for each member, Sales, Costs, and Profits, of the MEASURES dimension 418. The fact tables 402 through 422 also contain one column, TIME 404 and 424 and PRODUCT 406 and 426, for each other non-anchor dimension, TIME 414 and PRODUCT 416.

Fact Table

In the preferred embodiment of the present invention, there are N fact tables for each Cube (e.g., FACT TABLE-1 and FACT TABLE-N, along with the ellipses in FIG. 4, illustrate multiple fact tables). The fact tables hold the actual data values of the Cube. In particular, each fact table holds a data block, which is a portion of the Cube. The fact tables 402 through 422 have a dimension column corresponding to each non-anchor dimension table 414 and 416. The dimension columns of the fact tables 402 through 422 hold relational member identifiers, and the non-anchor dimension tables 414 and 416 hold the mapping between those relational member identifiers and the member names and multi-dimensional member identifiers. The data values in the fact tables 402 through 422 are indexed by the relational member identifiers from each of the dimension columns.

For example, one row in the fact table 402 contains all data values for a unique combination of members from the different non-anchor dimension tables 414 and 416. Specifically, the dimension columns 404 and 406 contain relational member identifiers corresponding to the multi-dimensional member identifiers, and the member columns 408, 410, and 412 contain data values. For example, the first row in the example of FIG. 4, holds the Sales of 3500, Costs of 2500, and Profits of 1000 for every Product and all Times. Moreover, the second row, in the example of FIG. 4, holds the Sales of 1650, Costs of 1200, and Profits of 450 for Product A during the 1997 Time frame.

The fact tables 402 through 422 only hold rows for valid combinations of members from the non-anchor dimensions. So, for example, if a particular product is not sold in a year, there will be no sales, costs or profit figures for any time period for that product in that year. Consequently, the fact tables 402 through 422 would not hold any rows for these combinations.

Dimension Tables

As described above, there is one dimension table for each dimension defined in the Cube (i.e., based on the outline). The purpose of the dimension tables is to hold all information relevant to the members of a particular dimension.

Each dimension table contains one row for each member defined in the associated dimension. Note that the dimension name itself is considered to be a member since it represents the top level of the hierarchy for that dimension. The columns are as follows:

MemberName—This is the member name. It is the user-entered name for each member. The value of the MemberName is set to a NULL value if this member is deleted. When a RelMemberId is required, the RelMemberId corresponding to a MemberName which is a NULL value is reused.

RelMemberName—This is the relational member name. It is only used in the Anchor dimension table (because the members from this dimension map to columns in the fact table 402). This column therefore needs to contain valid relational column names. Therefore, this column may contain member names which have been modified from those stored in MemberName, if necessary.

RelMemberId—This is the relational member identifier. This contains an identifying number for each member used to access data in the relational database. This number is unique within the dimension table. This column is used to 'join' the dimension table to the fact table. Members always retain the same relational member identifier throughout their life time. A relational member identifier may be reused if a member is deleted and another member is created.

MemberId—This is the multi-dimensional member identifier. This contains an identifying number allocated to the member by Essbase. When a Cube definition is altered in Essbase and the Essbase database is restructured, this value may be changed by Essbase. This is a NULL value if MemberName is a NULL value.

The MemberName is typically obtained from the outline. The MemberId is assigned by Arbor Software's Essbase OLAP software and is used by this software to access multi-dimensional data stored in dense data blocks in a multi-dimensional database 300. The RelMemberId is the common column between the non-anchor dimension tables 414 and 416 and the fact tables 402 through 422 that is used to join the tables 402, 414, and 416 and 422, 414, and 416 and is used to access data in the relational database 118 (i.e., fact table 402). The MemberId, which is used internally by Arbor Software's Essbase OLAP software, maps to the RelMemberId, which is used by the relational database 118 to access data.

Accessing Multi-Dimensional Data

To access the multi-dimensional data in the relational database 118, a user interacts with the OLAP client program 106 executed by the OLAP client 100. This interaction results in a request (i.e., command) for a database operation being formed, which is transmitted to the OLAP agent 110 and/or OLAP engine 112 executed by the OLAP server 102 via the network interface programs 104 and 108. The OLAP agent 110 communicates with the OLAP engine 112, and the OLAP engine 112 executes functions via the relational storage manager 114 to access the multidimensional data from a data storage manager. In Arbor Software's Essbase OLAP software, data is requested by specifying one or more sparse index keys (i.e., a sparse index key is an encoding of one member from each sparse dimension) that identify one or more dense data blocks in the multi-dimensional database 300.

In the present invention, these sparse index keys comprise combinations of one MemberId for each sparse dimension used internally in Arbor Software's Essbase OLAP software. The relational storage manager 114 requests the OLAP Engine 112 to decompose the sparse index key into a list of MemberIds. The relational storage manager 114 maps the MemberIds to the RelMemberId used in the relational database 118 via the respective non-anchor dimension tables 414 and 416 in the relational database 118. Then, the RelMemberIds are used to access the respective non-anchor dimension tables 414 and 416 in the relational database 118. The resulting rows of the non-anchor dimension tables 414 and 416 are joined to corresponding rows in the fact tables 402 through 422.

As mentioned above, each fact table contains multiple data blocks. When the OLAP client program 106 submits, via the OLAP agent 110 and OLAP engines 112, a request to the relational database, the OLAP client program 106 reads or writes data from a single data block. Therefore, when the relational storage manager 114 maps MemberIds to RelMemberIds, the relational storage manager 114 also determines which one of the fact tables 402 through 422 contains the data corresponding to the data block to be accessed. Thus, only one of the fact tables 402 through 422 is accessed to respond to a request. The rows of the selected fact table 402 through 422, which thus meet the criteria of the sparse index keys, are returned by the DB2 server 116 to the relational storage manager 114.

The rows returned have RelMemberIds followed by values for each of the members of the anchor dimension (e.g., the MEASURES dimension 418 in FIG. 4). The relational storage manager 114 then converts the RelMemberIds into MemberIds and reformats the rows from the fact table 402 into a "dense data block". The reformatted rows are passed to the OLAP engine 112, which ultimately return the desired data to the OLAP client 106.

Another advantage of the embodiment of the invention is that the relational storage manager 114 defines a view of the fact tables as a single fact table. A user can write a customized application (i.e., a customer written application) to select information from the view. Thus, the customized application is not aware that the data has been partitioned among several tables. That is, to shield customized applications from this partitioning of the data, the relational storage manager 114 creates a view of the partitioned fact tables (i.e., UNIONed SELECTs) that appears to be and acts identically to a single fact table when queried (i.e., with SELECTs) Additionally, the customized application conmnunicates directly with the DB2 Server 116 and does not need to communicate with the relational storage manager 114. To provide this view, the relational storage manager 114 SELECTS all of the rows from each of the fact tables and combines the rows using a UNION operation to form a view comprising a single fact table. Thus, the use of multiple fact tables is transparent.

In this manner, the relational database 118 can be used to emulate multi-dimensional data in a multi-dimensional database 300. Moreover, by converting between MemberIds of the sparse index keys and RelMemberIds, the DB2 server 116 is able to treat the data in the relational database 118 as dense data blocks for Arbor Software's Essbase OLAP software, while actually maintaining the data in a relational database 118.

In an alternative embodiment, the MemberIds and the RelMemberIds are mapped to each other using two in-memory arrays. The array used to map MemberIds to RelMemberIds has an element for each MemberId containing the corresponding RelMemberId. The array used to map RelMemberIds to MemberIds has an element for each RelMemberId containing the corresponding MemberId. These arrays are generated after the outline is created, and they are reconstructed each time the relational storage manager 114 initializes or "opens" the multi-dimensional database and after each outline restructure.

In Arbor Software's Essbase model of a multi-dimensional database, the dense data blocks of the multi-dimensional database are ordered by the numerical values of their sparse index keys. In the present invention, the relational storage manager 114 maintains the ordering of the dense data blocks by storing the sparse index keys in a key table. The relational storage manager 114 holds also holds additional information about each dense data block in the key table. In particular, the information includes status information (e.g., usage information) and timestamps (e.g., age information).

Outline Modifications

When the outline is modified, the relational database 118 is modified. In particular, when an outline is changed, Arbor Software's Essbase OLAP software may change the MemberIds for members defined in the outline. When this happens, the MemberIds in the dimension tables 414, 416, and 418 are updated accordingly. When a member is deleted from the outline, the corresponding row of the dimension table 414, 416, or 418 is marked as being available by updating the MemberId and the MemberName to be NULL values. Moreover, when a member is added to the outline, a RelMemberId is sought for the member. A RelMemberId in a table that is available is used (i.e., a RelMemberId corresponding to a MemberName having a NULL value). When no such RelMemberId is available, a new RelMemberId is generated for the newly added member.

Improving Performance of Table Insertion by Using Multiple Tables or Multiple Threads The embodiment of the present invention improves performance of table insertion by using multiple tables or multiple threads. In particular, multiple concurrent transactions may manipulate data in the fact, dimension, and key tables of the relational star schema managed by the DB2 Server 416. In doing so, one OLAP client 106 transaction may be mapped to multiple relational storage manager 114 transactions. Performance is improved for table insertions both for data loading (i.e., when loading data initially into the fact and key tables) and data calculations (which involves inserting data into the fact and key tables).

As discussed above with respect to FIG. 4, in one embodiment of the invention, the star schema comprises N fact tables joined to multiple dimension tables. Each fact table contains the data for multiple data blocks. Additionally, a key table contains information about the data blocks. In particular, the information includes status information (e.g., usage information), timestamps (e.g., age information), and a block key (i.e., the sparse index key comprised of Member Ids). When a new multi-dimensional database is created, the relational storage manager 114 creates the N fact tables of the star schema. By creating N fact tables, the relational storage manager 114 is able to perform operations in parallel across the N fact tables and the separate key table, leading to more efficient database processing. In an alternative embodiment, the star schema may be comprised of one fact table, dimension tables, and a key table. In this scenario, the fact table and key table may be accessed in parallel, leading to more efficient processing.

In particular, the relational storage manager 114 uses concurrent threads with separate database connections when performing input/output (I/O) operations. In one embodiment, these operations are: INSERT, UPDATE, and DELETE. The applications (e.g., the OLAP client program 106) submit different requests, each on a separate thread. Initially, the relational storage manager 114 generates a single thread with a single connection to the relational database for each session started by the OLAP engine 112. The OLAP engine 112 starts a session for each application that submits requests to the OLAP engine 112. For example, if four applications submit requests to the OLAP engine 112, then the relational storage manager 114 generates four separate threads, each with a different connection.

If the relational storage manager receives a request that requires only reading data, the relational storage manager 114 uses the single thread to read the data in the fact tables and the key table. When the relational storage manager 114 receives a request that requires writing data, the relational storage manager 114 generates multiple threads, one for each fact table and key table, with multiple connections, one for each fact table and key table.

A connection is a relational database concept that refers to enabling an application to submit requests to the relational database. A thread is an operating system concept in which a part of a program can execute independently from other parts. Operating systems that support multithreading enable programmers to design programs whose threaded parts can execute concurrently.

In order to provide concurrent operations, the relational storage manager 114 uses N independent threads to access the N fact tables and another thread to access the key table. Each thread maintains an RDBMS connection with exactly one of the tables (i.e., the fact tables and key table). This allows the relational storage manager 114 to write multiple blocks concurrently.

The relational storage manager 114 uses a hashing function (i.e., a partitioning function) based on the sparse dimension identifiers to determine, for a block of data, the fact table in which the block of data is to be stored. Because the sparse dimension identifiers are used to store data in particular fact tables, each fact table contains multiple data blocks that were hashed to that particular table as determined by the set of sparse dimension identifiers. In one embodiment, the hashing function maps the MemberIds of the sparse index key to RelMemberIds, adds the RelMemberIds, and mods by N (i.e., the number of fact tables). The hashing function is based on the RelMemberIds instead of the MemberIds so that data does not have to be redistributed between fact tables when MemberIds change.

In some systems, there may be only one fact table. In this case, some may suggest that partitioning the work of data manipulation among independent, concurrent execution threads provides the same benefit as partitioning the fact table into N fact tables, and so avoids the need for partitioning the fact table. However, given the large transaction sizes handled by the relational storage manager 114 and the actual implementation of most RDBMSs today, database deadlocks may result when a large number of rows are manipulated in a given table by independent transactions. In particular, a relational database has limited resources that it uses for tracking accesses to the relational database. If many independent transactions are accessing a single table, the relational database may run out of resources to perform the tracking. This causes the database deadlock. Therefore, the use of N fact tables rather than one fact table is advantageous in avoiding database deadlocks.

In particular, the relational database 118 locks rows (i.e., using row-level locking) until a commit occurs to avoid having rows modified by a second transaction while a first transaction operates on those rows. A commit is a database operation that indicates that the data in temporary storage, such as a cache, is to be copied to persistent storage, such as a database. Note that the OLAP engine 112 generates a commit based on system settings and client requests and forwards the commit to the relational storage manager 114. When multiple transactions are accessing rows in a single table, the relational database 118 may lock the table to allow only one transaction to operate on the rows of the table. This causes the database to prevent multiple transactions from concurrently accessing a table. Thus, having multiple threads access a single fact table is not efficient.

Furthermore, the relational database inserts data into a table serially (i.e., data is inserted one row at a time), therefore, by using multiple fact tables, data may be inserted into each of the tables concurrently, providing additionally efficiency.

Figure 5:
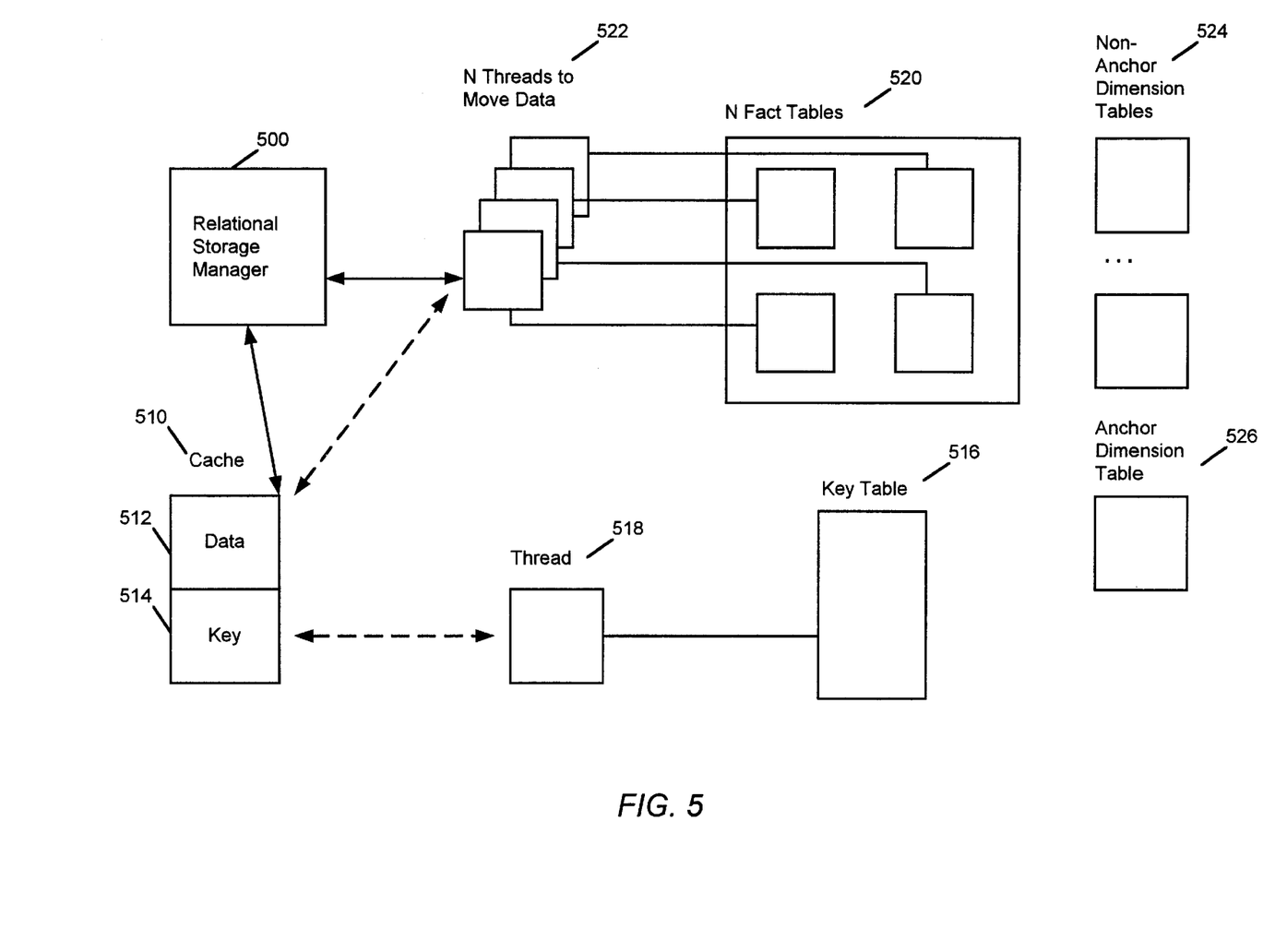
FIG. 5 is a block diagram illustrating improved performance of table insertion by using multiple tables or multiple threads.

FIG. 5 is a block diagram illustrating improved performance of table insertion by using multiple tables or multiple threads. In the following example, the OLAP client 106 writing (i.e., inserting) data into the fact tables 520. However, one skilled in the art would recognize that this is only one example of using multiple fact tables and a key table and that other operations could be performed, such as updating or deleting values stored in the fact tables.

As shown in FIG. 5, the relational storage manager 500 maintains a cache 510 in memory. Additionally, fact tables 520, non-anchor dimension tables 524, anchor dimension table 526, and key table 516 are stored in persistent storage.

When data is to be written, initially, a data block and its sparse index key are presented to the relational storage manager 500 by a multi-dimensional database calculation engine (MDCE) (which is part of the OLAP engine 112) for writing to persistent storage. The MDCE accesses a single data block at a time for a transaction, with a data block corresponding to data in one fact table. Note that the MDCE actually receives multiple requests from different applications. The MDCE uses a separate thread for each request when communicating with the relational storage manager 500. However, when the MDCE requests data for an application, the MDCE pauses processing for that application until the data is received. After receiving a request from the MDCE, the relational storage manager 500 copies the requested data to a memory-resident cache 510 and returns control to the MDCE.

The cache 510 holds fact table data 512 and key table information 514. The data 512 includes data retrieved from the fact tables 520 in response to a request for data from the OLAP client 106, and this data is returned by the relational storage manager 500 to the OLAP engine 112, which returns the data to the OLAP client 106. Additionally, the data 512 may include data to be written to the fact tables 520.

The key table information 514 includes entries, with each entry containing status information (e.g., usage information), timestamps (e.g., age information), and a block key(i.e., the sparse index key comprised of Member Ids). The block key is a sparse index key, which comprises a combination of one MemberId for each sparse dimension used internally in Arbor Software's Essbase OLAP software.

After the MDCE submits a request to commit data (i.e., to copy data from the cache to the relational database), or when a predetermined amount of data for the fact tables has been written to the cache (i.e., there are "dirty" or modified data blocks in the cache), a group of data blocks is selected to be written to the fact tables 520. A hashing function is used to determine which rows corresponding to the data blocks are to be in which of the N fact tables. The set of sparse dimension identifiers (i.e., MemberIds) used in a hashing function can be derived from the sparse index key that identifies a data block. The hashing function maps the MemberIds of the sparse index key to RelMemberIds, adds the RelMemberIds, and mods by N. This allows each of the N threads 522 that move data to and from the fact tables 520 to determine which rows it is responsible for writing to its corresponding fact table 520. Additionally, the thread 518 is used to manipulate key table 516 entries corresponding to the rows in parallel with the N threads 522. Thus data is written into the relational database concurrently using N threads 522 and thread 518.

That is, when the MDCE specifies that a transaction is to be committed, all cache data that has not been written to one of the fact tables 520 is then written to the appropriate fact tables 520 e key table 516, and the RDBMS 116 is instructed to commit all data it has received. Similarly, when there are a predetermined number of "dirty" data blocks in the cache, they are written to the appropriate fact tables 520 and the key table 516.

This allocation of multiple threads, each having a separate database connection, for each fact table and the key table ensures that the fact tables and the key table of the relational storage manager 500 star schema can be modified concurrently without causing RDBMS 116 deadlocks.

The following is an additional example in which data is retrieved from one of the fact tables 520. When the relational storage manager receives a request to retrieve data that is identified by a sparse index key, the relational storage manager 500 identifies the fact table containing the requested data. Next, the relational storage manager 500 uses a single thread 522 corresponding to the identified fact table to retrieve data from the identified fact table 520. The relational storage manager 500 retrieves the rows that correspond to the sparse index key. The relational storage manager 114 stores this data in the cache 510. Additionally, in one embodiment, the relational storage manager 114 accesses the key table 516 with the same thread 522, rather than with a separate thread. The relational storage manager 114 retrieves an entry from the key table containing information about the data block retrieved from the fact table and stores this data in the cache 510. Next, the OLAP engine 112 processes the retrieved data in the cache 510 (e.g., performs calculations).

Figure 6:
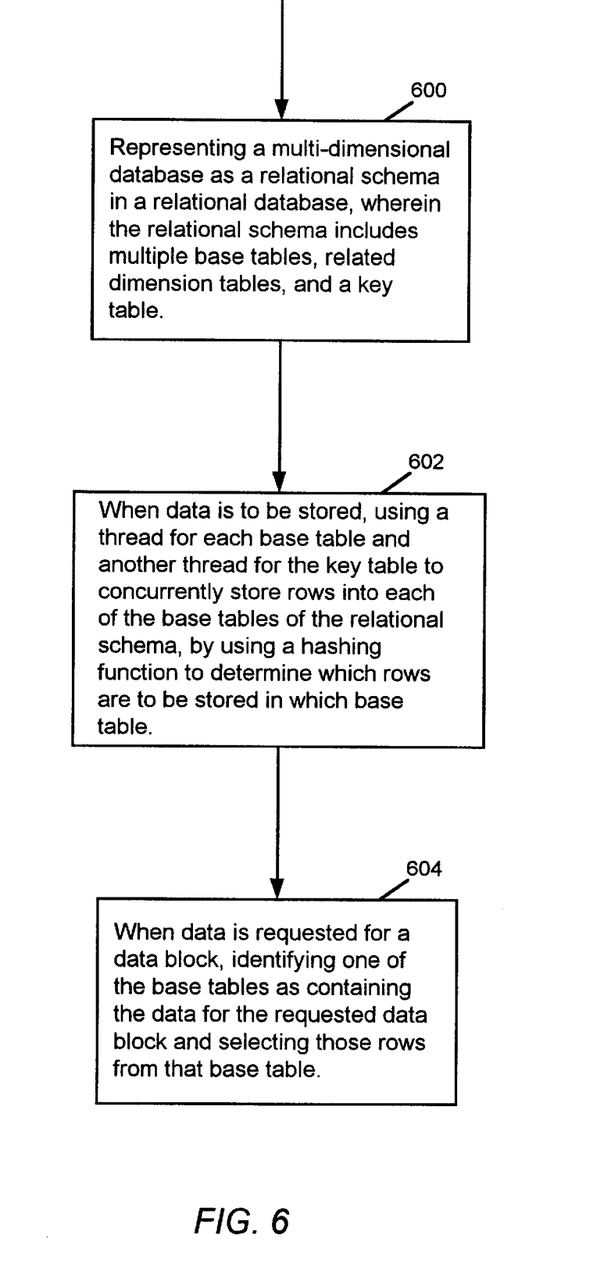
FIG. 6 is a flow diagram illustrating the steps performed by the relational storage manager 114 to improve performance of table insertion by using multiple tables or multiple threads.

FIG. 6 is a flow diagram illustrating the steps performed by the relational storage manager 114 to improve performance of table insertion by using multiple tables or multiple threads. In block 600, the relational storage manager 114 represents a multi-dimensional database as a relational schema in a relational database, wherein the relational schema includes multiple base tables, related dimension tables, and a key table. In block 602, when data is to be stored, the relational storage manager 114 uses a thread for each base table and another thread for the key table to concurrently store rows into each of the base tables of the relational schema. In particular, the relational storage manager 114 uses a hashing function to determine which rows are to be stored in which base table. In block 604, when data is requested for a data block, the relational storage manager 114 identifies one of the base tables as containing the data for the requested data block and selects the rows for the data block (i.e., with a SELECT operation on the base and key tables) from the identified base table.

When multi-dimensional model changes involve additions to, or deletions from, the set of sparse dimensions (e.g., changes to the set of sparse dimensions in the outline of FIG. 2), the partitioning of the data among the N fact tables becomes invalid. In-particular, when the set of sparse index keys change, each data block may correspond to a fact table different from the fact table to which the data block corresponded prior to the change in the set of sparse index keys. Likewise, the hashing function, which is based on the set of sparse index keys, may have assigned rows to fact tables using the previous set of sparse index keys so that the rows stored using the previous set of sparse index keys may no longer be in the correct fact table. In particular, the changes to the set of sparse dimensions include: additions to the set of sparse dimensions; deletions from the set of sparse dimensions; conversion of a sparse dimension to a dense dimension; and, conversion of a dense dimension to a sparse dimension.

The relational storage manager resolves this problem by creating N new fact tables and redistributing the data in the old fact tables among the new fact tables. The relational storage manager does this using N concurrent threads and connections and one for each new fact table.

Figure 7:
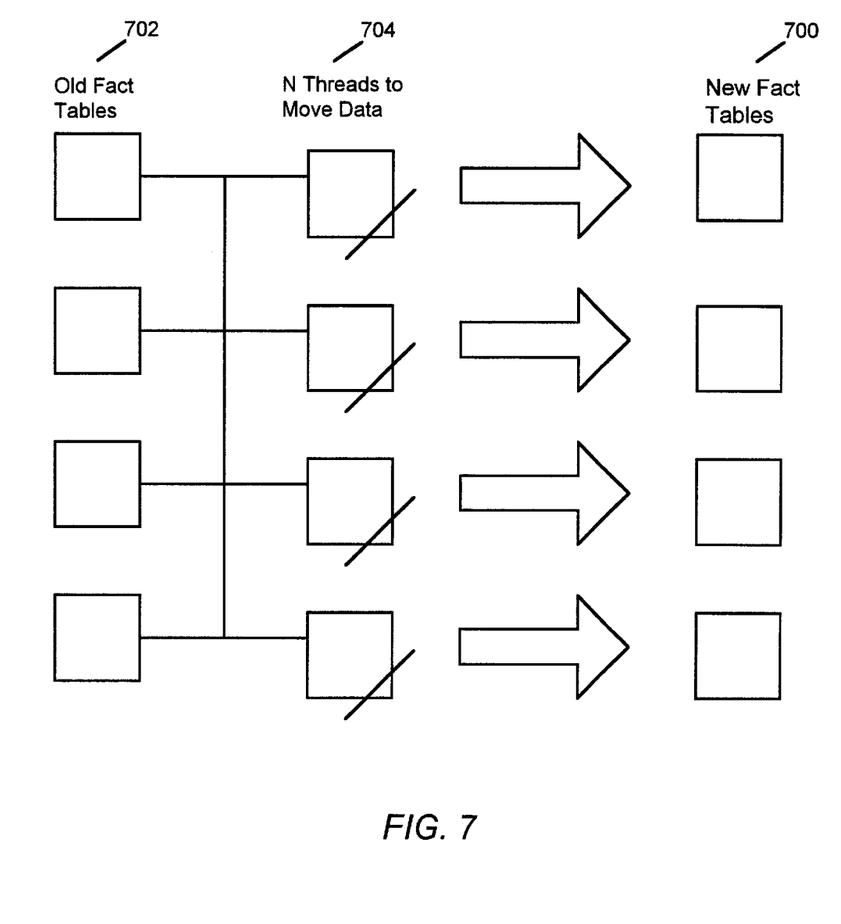
FIG. 7 is a block diagram illustrating the relational storage manager using N threads to redistribute data among N fact tables.

FIG. 7 is a block diagram illustrating the relational storage manager 114 using N threads to redistribute data among N fact tables. When the set of sparse dimension identifiers change, the relational storage manager 114 creates N new fact tables 700 and then redistributes the data of the old fact tables 702 into the new fact tables 700. In particular, the relational storage manager starts N threads 704 concurrently to perform the redistribution. Each of the N threads 704 stores data into one new fact table 700. Also, each of the threads may retrieve data from each of the fact tables 702. In particular, each thread recognizes the rows that should be stored into its corresponding new fact table 700. Therefore, each thread 704 retrieves these rows from the old fact tables 702 for storage into the corresponding new fact table 700.

In one embodiment, the data is moved using an INSERT with a subselect clause. This type of INSERT enables moves between two tables and avoids the need to retrieve data from an old fact table, store the data in an application's memory, and move the data from memory into a new fact table. Then, each of the N threads performs N INSERT statements with a subselect clause against each of the old fact tables. The subselect clause retrieves the appropriate rows from each of the old fact tables; while the INSERT inserts these rows into the new fact table corresponding to that thread.

In an alternative embodiment (i.e., on a workstation version of DB2 for a Universal Database (UDB)), a NOT LOGGED INITIALLY clause is available. The NOT LOGGED INITIALLY clause indicates to the RDBMS 116 that the initial transaction for creating a table is not to be logged. By avoiding this logging, the RDBMS 116 provides improved performance. Thus, the relational storage manager 114 creates the new fact tables 700 with the NOT LOGGED INITIALLY clause. This improves redistribution performance by preventing the RDBMS 116 from using I/O or CPU resources for a log file.

Figure 8:
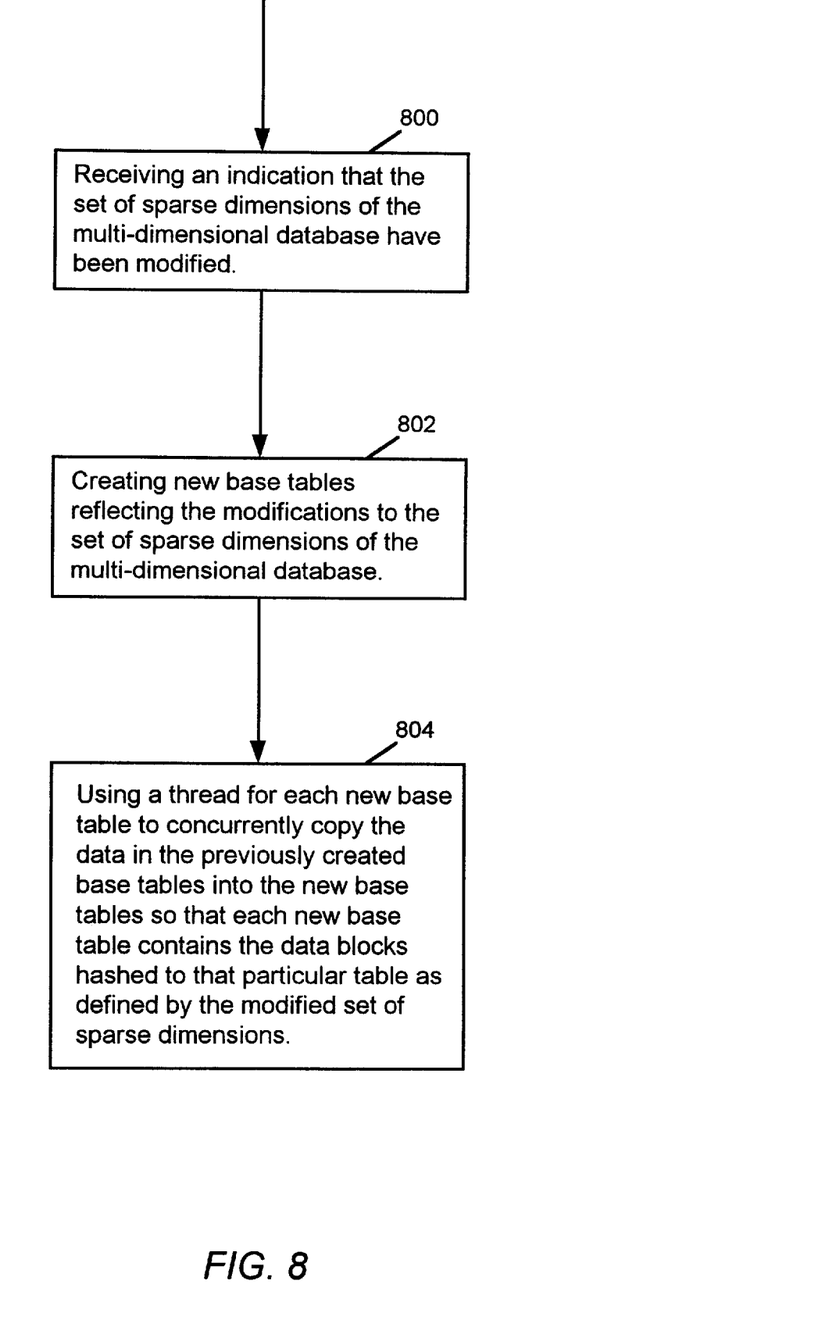
FIG. 8 is a flow diagram illustrating the steps performed by the relational storage manager 114 when a set of sparse dimensions in the multi-dimensional database are modified.

FIG. 8 is a flow diagram illustrating the steps performed by the relational storage manager 114 when a set of sparse dimensions in the multi-dimensional database are modified. In block 800, the relational storage manager 114 receives an indication that the set of sparse dimensions of the multi-dimensional database have been modified. In particular, the changes to the set of sparse dimensions include: additions to the set of sparse dimensions; deletions from the set of sparse dimensions; conversion of a sparse dimension to a dense dimension; and, conversion of a dense dimension to a sparse dimension. In block 802, the relational storage manager 114 creates new base tables reflecting the modifications to the set of sparse dimensions. In block 804, using a thread for each new base table, the relational storage manager 114 concurrently copies the data in the previously created (or old) base tables into the new base tables, so that each new base table contains data blocks hashed to that particular base table as defined by the modified set of sparse dimensions.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a command in a computer to perform a database operation on a relational database stored on a data store connected to the computer, the method comprising the steps of:

representing a multi-dimensional database as a relational schema in the relational database, wherein the relational schema includes one or more base tables, related dimension tables, and a key table; and concurrently accessing each of the base tables and the key table to perform the database operation.

2. The method of claim 1, wherein the multi-dimensional database has one or more dimensions having one or more members, with each value in the multi-dimensional database being identified by the intersection of one member from each dimension.

3. The method of claim 2, wherein the relational schema has a dimension table corresponding to each dimension of the multi-dimensional database.

4. The method of claim 1, further comprising the step of concurrently accessing each of the base tables and the key table with an independent thread.

5. The method of claim 4, wherein each thread maintains a separate database connection.

6. The method of claim 5, wherein the step of concurrently accessing further comprises the step of writing data into the base tables and the key table.

7. The method of claim 1, further comprising the step of reading data from one of the base tables and the key table using a single thread.

8. The method of claim 1, further comprising the step of creating a view of the multiple base tables so that they appear as a single base table.

9. The method of claim 1, further comprising the step of identifying which data goes into which table using a hashing function based on a set of sparse dimension identifiers that identify dimensions in the multi-dimensional database.

10. The method of claim 1, further comprising the step of:

when the set of sparse dimensions of the multi-dimensional database change, modifying the relational schema; and redistributing the data according to the changed set of sparse dimensions.

11. The method of claim 10, wherein the base tables are old base tables, and wherein the step of redistributing data further comprising-the steps of:

creating new base tables; and moving data from the old base tables into the new base tables using independent threads that use an insert statement with a subselect clause to minimize data movement.

12. The method of claim 11, further comprising the step of creating the new base tables while eliminating logging on an initial transaction.

13. The method claim 1, wherein data is stored in a cache and further comprising the steps of:

determining that a predetermined amount of data is stored in the cache; and copying that predetermined amount of data from the cache into the relational database.

14. The method of claim 1, wherein data is stored in a cache and further comprising the steps of:

receiving an indication to commit data;

copying the data from the cache into the relational database; and committing the data in the relational database.

15. The method of claim 1, wherein the key table stores information about a data block in the multi-dimensional database.

16. An apparatus for executing a command in a computer, comprising:

a computer having a data store coupled thereto, wherein the data store stores a relational database; and one or more computer programs, performed by the computer, the one or more computer programs representing a multi-dimensional database as a relational schema in the relational database, wherein the relational schema includes one or more base tables, related dimension tables, and a key table, and the one or more computer programs further concurrently accessing each of the base tables and the key table to perform a database operation.

17. The apparatus of claim 16, wherein the multi-dimensional database has one or more dimensions having one or more members, with each value in the multi-dimensional database being identified by the intersection of one member from each dimension.

18. The apparatus of claim 17, wherein the relational schema has a dimension table corresponding to each dimension of the multi-dimensional database.

19. The apparatus of claim 16, further comprising means for concurrently accessing each of the base tables and the key table with an independent thread.

20. The apparatus of claim 19, wherein each thread maintains a separate database connection.

21. The apparatus of claim 20, wherein the step of concurrently accessing further comprises the step of writing data into the base tables and the key table.

22. The apparatus of claim 16, further comprising means for reading data from one of the base tables and the key table using a single thread.

23. The apparatus of claim 16, further comprising means for creating a view of the multiple base tables so that they appear as a single base table.

24. The apparatus of claim 16, further comprising means for identifying which data goes into which base table using a hashing function based on a set of sparse dimension identifiers that identify dimensions in the multi-dimensional database.

25. The apparatus of claim 16, further comprising:

when the set of sparse dimensions of the multi-dimensional database change, means for modifying the relational schema; and means for redistributing the data according to the changed set of sparse dimensions.

26. The apparatus of claim 25, wherein the base tables are old base tables, and wherein means for redistributing data further comprises:

means for creating new base tables; and means for moving data from the old base tables into the new base tables using independent threads that use an insert statement with a subselect clause to minimize data movement.

27. The apparatus of claim 26, further comprising means for creating the new base tables while eliminating logging on an initial transaction.

28. The apparatus of claim 16, wherein data is stored in a cache and further comprising:

means for determining that a predetermined amount of data is stored in the cache; and means for copying that predetermined amount of data from the cache into the relational database.

29. The apparatus of claim 16, wherein data is stored in a cache and further comprising:

means for receiving an indication to commit data;

means for copying the data from the cache into the relational database; and means for committing the data in the relational database.

30. The apparatus of claim 16, wherein the key table stores information about a data block in the multi-dimensional database.

31. An article of manufacture comprising a program storage medium readable by a computer and embodying one or more instructions executable by the computer to perform method steps for executing a command to perform a database operation on a relational database stored on a data store connected to the computer, the method comprising the steps of:

representing a multi-dimensional database as a relational schema in the relational database, wherein the relational schema includes one or more base tables, related dimension tables, and a key table; and concurrently accessing each of the base tables and the key table to perform the database operation.

32. The article of manufacture of claim 31, wherein the multi-dimensional database has one or more dimensions having one or more members, with each value in the multi-dimensional database being identified by the intersection of one member from each dimension.

33. The article of manufacture of claim 32, wherein the relational schema has a dimension table corresponding to each dimension of the multi-dimensional database.

34. The article of manufacture of claim 31, further comprising the step of concurrently accessing each of the base tables and the key table with an independent thread.

35. The article of manufacture of claim 34, wherein each thread maintains a separate database connection.

36. The article of manufacture of claim 35, wherein the step of concurrently accessing further comprises the step of writing data into the base tables and the key table.

37. The article of manufacture of claim 31, further comprising the step of reading data from one of the base tables and the key table using a single thread.

38. The article of manufacture of claim 31, further comprising the step of creating a view of the multiple base tables so that they appear as a single base table.

39. The article of manufacture of claim 31, further comprising the step of identifying which data goes into which base table using a hashing function based on a set of sparse dimension identifiers that identify dimensions in the multi-dimensional database.

40. The article of manufacture of claim 31, further comprising the step of:

when the set of sparse dimensions of the multi-dimensional database change, modifying the relational schema; and redistributing the data according to the changed set of sparse dimensions.

41. The article of manufacture of claim 40, wherein the base tables are old base tables, and wherein the step of redistributing data further comprising the steps of:

creating new base tables; and moving data from the old base tables into the new base tables using independent threads that use an insert statement with a subselect clause to minimize data movement.

42. The article of manufacture of claim 41, further comprising the step of creating the new base tables while eliminating logging on an initial transaction.

43. The article of manufacture of claim 31, wherein data is stored in a cache and further comprising the steps of:

determining that a predetermined amount of data is stored in the cache; and copying that predetermined amount of data from the cache into the relational database.

44. The article of manufacture of claim 31, wherein data is stored in a cache and further comprising the steps of:

receiving an indication to commit data;

copying the data from the cache into the relational database; and committing the data in the relational database.

45. The article of manufacture of claim 31, wherein the key table stores information about a data lock in the multi-dimensional database.

* * * * *

UNITED STATES PATENT AND TRADEMARK OFFICE
CERTIFICATE OF CORRECTION

PATENT NO. : 6,665,682 B1
DATED : December 16, 2003
INVENTOR(S) : DeKimpe et al.

It is certified that error appears in the above-identified patent and that said Letters Patent is hereby corrected as shown below:

Column 20,
Line 42, please delete "lock" and substitute -- block -- therefor.

Signed and Sealed this

Twenty-ninth Day of June, 2004

JON W. DUDAS
*Acting Director of the United States Patent and Trademark Office*